July 20, 1954     B. LASSMAN ET AL     2,683,982

SYSTEM FOR HYDROSTATICALLY TESTING HOLLOW BODIES

Filed Oct. 7, 1948     4 Sheets-Sheet 1

INVENTORS
BENJAMIN LASSMAN &
LEO ARTHUR LASSMAN
by Hooper, Leonard & Glenn
Their attorneys July 20, 1954  B. LASSMAN ET AL  2,683,982
SYSTEM FOR HYDROSTATICALLY TESTING HOLLOW BODIES
Filed Oct. 7, 1948  4 Sheets-Sheet 2

INVENTORS
BENJAMIN LASSMAN &
LEO ARTHUR LASSMAN
by Hoopes, Leonard & Glenn
their attorneys July 20, 1954  B. LASSMAN ET AL  2,683,982
SYSTEM FOR HYDROSTATICALLY TESTING HOLLOW BODIES
Filed Oct. 7, 1948  4 Sheets-Sheet 3
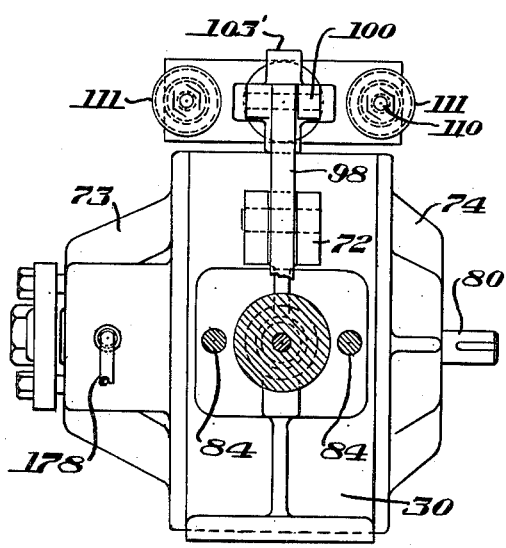
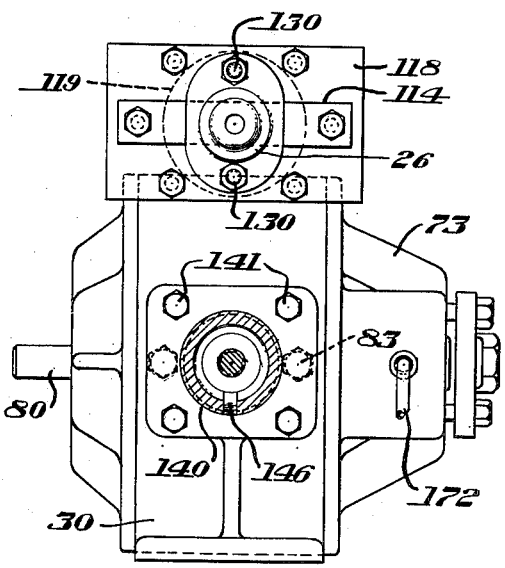
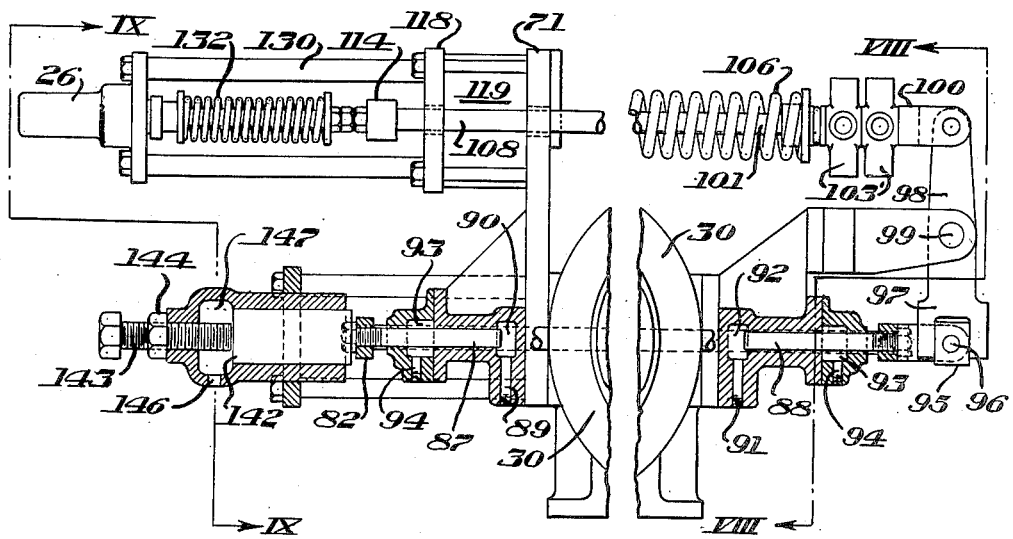
INVENTORS
BENJAMIN LASSMAN &
LEO ARTHUR LASSMAN July 20, 1954  B. LASSMAN ET AL  2,683,982
SYSTEM FOR HYDROSTATICALLY TESTING HOLLOW BODIES
Filed Oct. 7, 1948  4 Sheets-Sheet 4
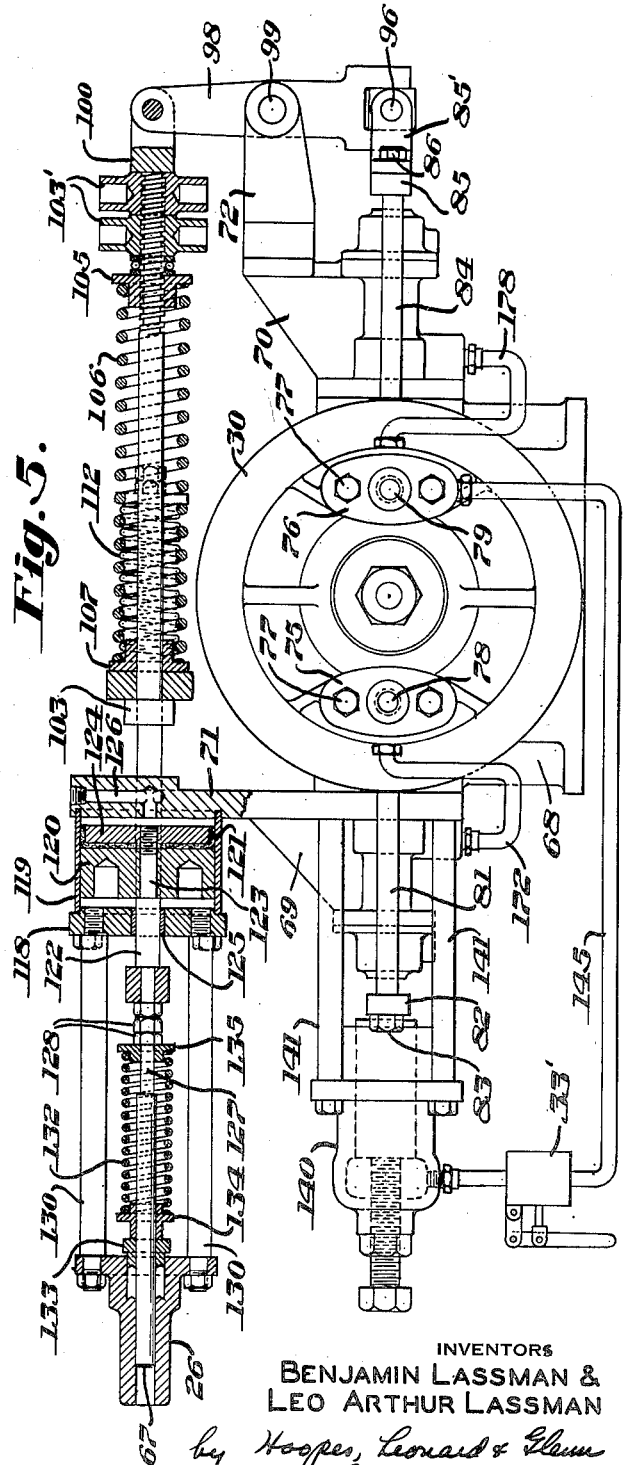
INVENTORS
BENJAMIN LASSMAN &
LEO ARTHUR LASSMAN
by Hoopes, Leonard & Glenn
their attorneys Patented July 20, 1954

2,683,982

UNITED STATES PATENT OFFICE 2,683,982

SYSTEM FOR HYDROSTATICALLY TESTING HOLLOW BODIES

Benjamin Lassman and Leo Arthur Lassman, Pittsburgh, Pa., assignors to Benjamin Lassman & Son, Glenshaw, Shaler Township, Allegheny County, Pa., a Pennsylvania partnership Application October 7, 1948, Serial No. 53,162

14 Claims. (Cl. 73—37)

This invention relates to a system for hydrostatically testing hollow bodies by means of water or other relatively incompressible fluid. More particularly, this invention relates to a system for the continuous and rapid pressure testing in production of pipes, flumes, tanks, tubes and other such hollow members customarily tested commercially in a machine known as a pipe bench, or when very large on the floor of the testing room. Moreover, this invention enables a single testing unit to operate with stability and accuracy through a very wide range of pressures on hollow bodies of considerable variance in diameter.

Heretofore, such testing has been subject to a number of disadvantages. Thus, in order to accommodate hollow bodies of differing internal diameters and further to accommodate tests at different testing pressures, it has been usual to provide for a plurality of pairs of sealing plungers of different sizes on one of the sealing heads, which pairs were selectively operable either independently or together. Moreover, in order to prevent leakage around the water prefilling tube and the various plungers and pistons employed at pressures ranging as high as 3000 pounds per square inch or higher, very substantial conventional packing methods were commonly used. The friction of such packing against the sliding parts of the sealing members introduced an added pressure element and caused considerable failure especially among thin-walled hollow bodies, such as steel pipe for gas pipelines, being tested near their yield strengths. Such failure was occasioned by the fact the sealing plungers not only had to seal the open ends of the test specimen against the testing pressure but had also to overcome the friction engendered in sliding the sealing members through such packing.

Difficulty was also encountered in attempting to have the equipment operate at over the range of pressures successively required during the testing cycle and in maintaining good production rates on the machines, particularly when each piece of pipe made has to be tested.

In a preferred embodiment, the present invention avoids the foregoing waste of material and provides a system for such testing which utilizes a sealing housing having but a single pair of sealing plungers to take care of the usual range of test specimen diameters and testing pressures encountered and having two separate pressure systems. One such system is the testing pressure system containing the fluid, usually water, for prefilling the test specimen and then subjecting it to testing pressure and the second is the sealing pressure system containing the hydraulic fluid for positioning the sealing plungers and then maintaining sealing pressure against the test specimen during prefilling and at the testing pressure stage.

The present invention overcomes the excessive frictional force formerly developed between conventional packing and the sliding parts, principally around the sealing plungers of the testing equipment, by the use of close machined fits to close capillary tolerances between the principal parts in sliding engagement. In addition, capillary lubrication of the moving members is obtained without undue leakage or loss of lubricant, since the fluid used in the sealing pressure system is preferably an oil suitable as a hydraulic fluid and a lubricant. Further, synchronization and proportioning between the testing pressure and the sealing pressure systems is provided through control means which subject the sealing pressure system by preadjustment of such control means to enough pressure at the various stages of the testing cycle to withstand the testing pressure at those various stages respectively, without oversealing and risk of specimen failure. Provision is also made in this invention for the automatic creep or take-up necessary as the test specimen shortens under the action of the testing pressure therein.

It is a further provision of this invention to furnish testing equipment capable of operating in a stable fashion over a wide range of pressures such as the range from 30 to 2500 pounds per square inch or higher. In addition, in order to avoid having the sealing force applied in advance of the testing pressure at a rate which might cause premature failure of the test specimen, provision is also made in the present invention for limiting the rate of application of the sealing pressure in a predetermined manner. Moreover, in the testing of hollow bodies of small diameters where the sealing force of the sealing plungers may inherently be too great, a countersealing means is provided to reduce the sealing force applied to that required by the test in question. Further, because of the numerous automatic features of the present invention, higher production rates of testing are obtained.

Other objects and advantages of this invention will be apparent from the further consideration of this specification and of the accompanying diagrammatic drawings, in which, Figure 1 is a schematic view of a general arrangement of a preferred embodiment of the system of this invention;

Figure 5 is a view in front elevation of a reversible adjustable hydraulic pressure pump with, in cross-section, the pump control mechanism therefor for use in the sealing pressure system;

Figure 6 is a plan view of a portion of the pump control mechanism shown in Figure 5;

Figure 7 is a view partly in cross section and partly in elevation of the pump control mechanism supported above and on either side of the adjustable pressure pump;

Figure 8 is a view taken along line VIII—VIII of Figure 7; and

Figure 9 is a view taken along line IX—IX of Figure 7.

General arrangement

Figure 1:
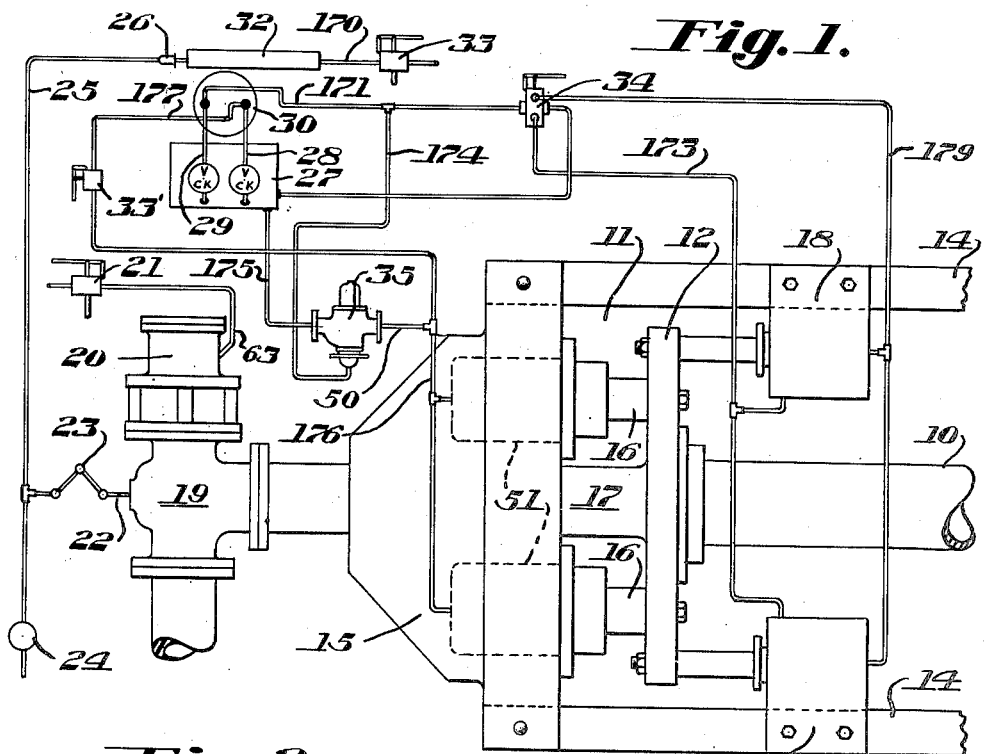

Referring to Figure 1 a test specimen in the form of a length of pipe 10 is placed in position in a test bench 11 between a sealing head or platen 12 and a rear sealing head 13. The rear sealing head 13 is held against rearward movement by tension bars 14. The rear sealing head 13 may be moved to different positions along the tension bars 14 when the pipe to be accommodated is of a different length than the existing setting of the bench. The sealing platen 12 is connected to a sealing housing 15 by sealing plungers 16 and a water prefilling tube 17 integral in this embodiment with sealing platen 12. The water prefilling tube 17 is slidably mounted in bearings 56 for axial movement through the sealing housing 15 and concentrically therewith. On the other side of sealing platen 12 are two hydraulic positioning cylinders 18 fastened to the tension bars 14 at the appropriate place for the testing of specimen 10. At the rear end of the water prefilling tube 17, there is a water valve 19 actuated through a single-acting air cylinder 20 by air valve 21. A high pressure water line 22 with water therein at testing pressure is connected to the rear of valve 19 through a flexible pressure coupling 23. The testing pressure water is admitted to the testing pressure system through a valve 24. A line connection 25 in the high pressure water line of the testing pressure system leads into a synchronization cylinder 26 whereby synchronization between the testing and sealing pressure systems is effected.

In the sealing pressure system the oil that is preferably used is supplied by a tank 27, from which it flows or is drawn through a check valve and line 28 or 29 into an adjustable pressure pump 30 which also possesses the features of reversible and variable delivery. This adjustable pressure pump 30 is a conventional type in which shifting the interior or working portions thereof to the right or left of the vertical center line through the axis of the pump produces discharge, respectively through the left or right port of the pump, with the intake in each such case respectively through the right or left port and corresponding to the outlet in the reverse operation. The pressure of the pump discharge is selectively varied by elements of a pump control mechanism 32 operating under the effect of preadjusted springs therein, synchronization cylinder 26, air valve 33, and valve 33'.

The positioning cylinders 18 are double-acting and are operated hydraulically by the oil from pump 30 when a four-way valve 34 is moved into the proper position. In bringing sealing platen 12 into engagement with pipe 10, sealing plungers 16 are withdrawn from sealing housing 15 and thereby fill their cylinders with oil from tank 27 through pipe 176, valve 35 and pipes 50 and 175. Valve 34 is then turned to relieve the pressure in cylinders 18 and sealing plungers 16 take up the task of putting the sealing members into sealing engagement with pipe 10 at low pressure during the prefilling of pipe 10 with water. Thereafter plungers 16 hold sealing platen 12 against the pipe 10 at a much higher sealing pressure without any excessive or oversealing force against pipe 10 during the testing thereof under testing pressure. A valve 35 allows the filling of the cylinders in sealing head 15 and also provides the necessary pressure relief at the conclusion of the testing cycle.

The pump control mechanism 32 acting through a series of adjustable springs, preadjusted to accomplish the given task, provides a suitable spring-controlled means for moving the sealing platen 12 into and out of engagement with the test specimen at the desired speed, and provides spring-controlled means for effecting sealing of the test specimen at the low pressures usually encountered during prefilling and at the very much greater pressures encountered during the testing of the test specimen under the testing pressure. During the delivery of sealing pressure by pump 30, an adjustable stop is provided to limit the application of the sealing pressure to a rate in accordance with the rate of application of testing pressure in the testing pressure system. When testing pipe of small diameter, if valve 33' is actuated a countersealing force is applied to reduce the sealing force inherent in the system as a result of the characteristics of the pump 30 and the area of the sealing plungers 16.

Testing bench mechanism

Figure 2:
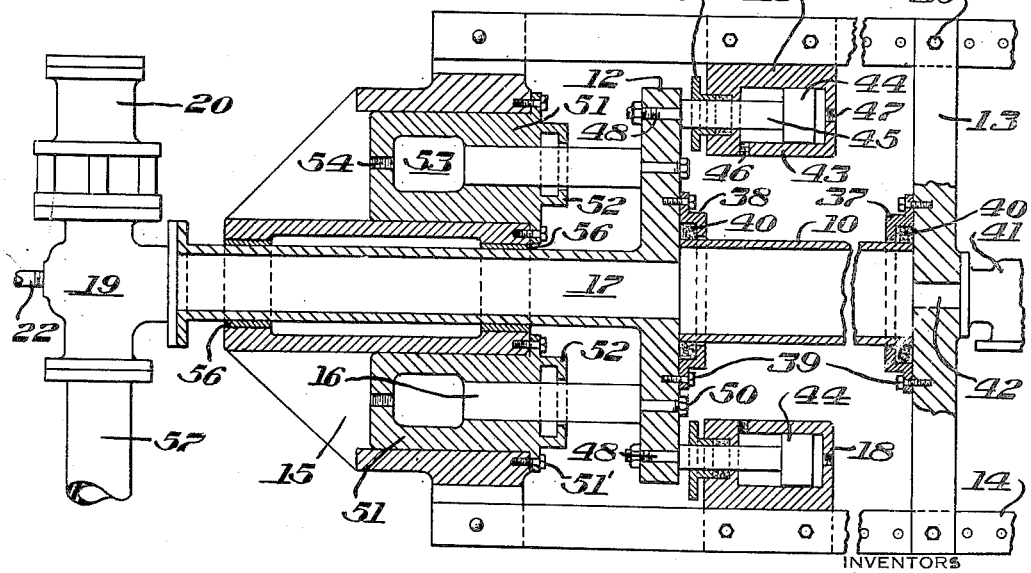
Figure 2 is a vertical cross sectional view through the sealing members of a test bench constructed in accordance with this invention.
Figure 3:
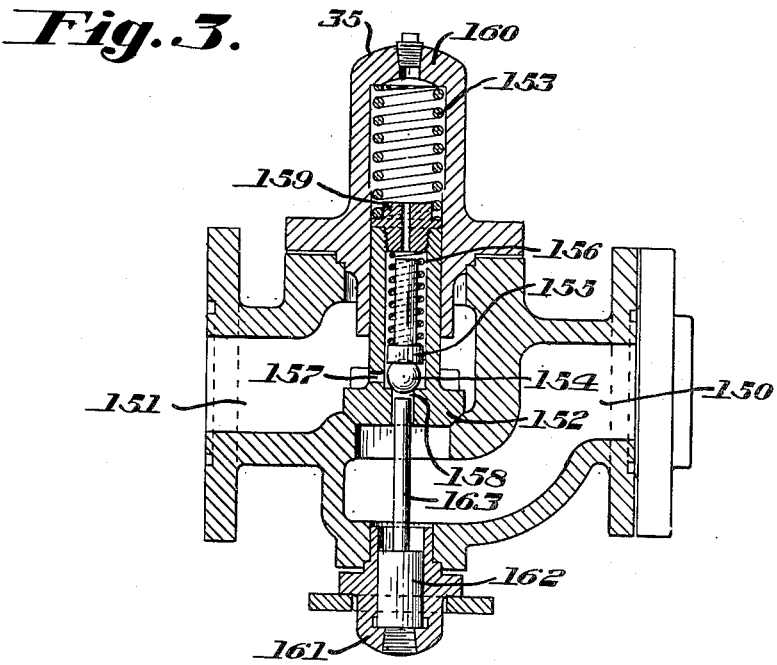
Figure 3 is a vertical cross sectional view through a valve used in the sealing pressure system.

As shown more particularly in Figure 2, the rear sealing head 13 is firmly bolted to tension bars 14 by bolts or pins 36 and cannot move in any direction. In order to effect end sealing of the test specimen, sealing rings 37 and 38 are respectively bolted to sealing head 13 and sealing platen 12 by bolts 39. Conventional packing 40 is used with these rings for the end sealing mentioned. Such sealing rings are selected in size to accommodate the diameter of pipe to be tested. In some cases, they can be made respectively integral with the sealing head 13 and platen 12. At the rear of sealing head 13 a purge valve 41 is attached. Valve 41 is normally open at the beginning of the testing cycle. When, during prefilling of pipe 10, water flows through the opening 42 in head 13 and valve 41 in a solid stream, it is an indication that the air in pipe 10 has been substantially expelled, whereupon valve 41 is closed.

The positioning of platen 12 against the front end of pipe 10 is performed by positioning cylinders 18 connected to tension bars 14 in the desired spaced relationship to the sealing head 13 and the length of pipe to be tested. Each positioning cylinder 18 is double-acting and comprises a cylinder 43, piston 44 and piston rod 45. Cylinder 43 has ports 46 and 47 respectively permitting the application of hydraulic pressure against the bottom and top of each piston. The end of each piston rod 45 abuts against the front of platen 12 and is fastened thereto by a stud and nut connection 48. Ordinarily, conventional packing is used in the cylinders 18 where the piston rods 45 pass through the end wall thereof, such conventional packing consisting of the stuffing box glands 49 bolted to the cylinders 18 and maintaining suitable packing around the piston rods 45.

Each sealing plunger 16 is also connected by a stud and nut connection 50 to sealing platen 12. These plungers 16 reciprocate in cylinders 51 on the front of each of which there is an oil collecting chamber 52. The machined fit between the plungers 16 and the bores of the cylinders 51 are made to very close tolerances, eliminating the need for packing and providing capillary lubrication of the plungers by the oil in the sealing pressure system without excessive loss or leakage of oil around the plungers. Oil which does pass out of the cylinders 51 is collected in chambers 52 for return to tank 27. Cylinders 51 are single-acting by the admission of oil to chamber 53 through port 54, in a forward or sealing engagement direction. In the embodiment shown, cylinders 51 are firmly bolted to sealing housing 15 by bolts 51'.

*Testing pressure system*

Extending through the center of the sealing head 15 is a water prefilling tube 17 slidably mounted in bearings 56 and concentric with pipe 10. Since tube 17 is made an integral part of platen 12, movement of one automatically moves the other. At the rear end of tube 17 a water valve 19 is connected through which prefill water at low pressure is supplied to tube 17 and thence to the pipe 10 into which tube 17 opens through the center of platen 12. A water hose 57 is in turn connected to the base of valve 19 to supply such prefill water.

Figure 4:
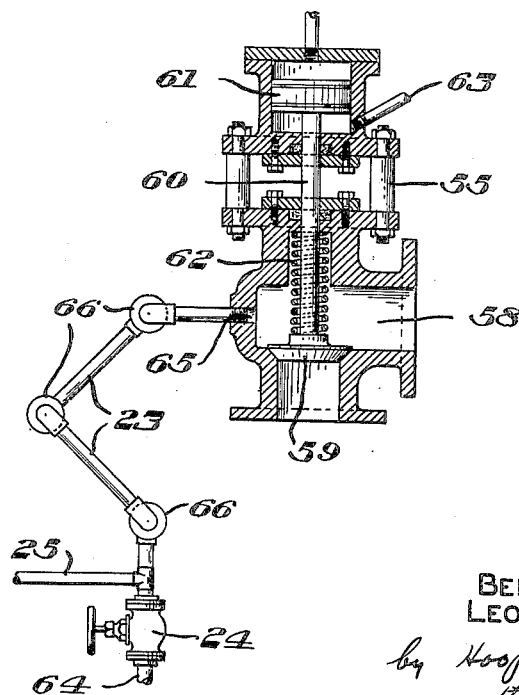
Figure 4 is a vertical cross sectional view through a low and high pressure water valve in the testing pressure system.

Referring to Figure 4, valve 19 comprises a chamber 58, the entrance to which from the low-pressure water inlet is blocked by a poppet valve 59 fixedly mounted at the lower end of a piston rod 60 connected to a piston 61 which reciprocates in air cylinder 20 spaced above the valve 19 by spacing bolts 55. A spring 62 keeps poppet valve 59 seated against any inflow of low pressure water from flexible hose 57 until compressed air is admitted into the cylinder 20 through a line 63 upon appropriate operation of three-way air valve 21.

High-pressure water enters the system at testing pressure through a line 64 and valve 24 whence it flows through the flexible pressure coupling 23 into valve chamber 58 through a port 65. The pressure coupling 23 has to be flexible and at the same time sealed against leakage at the joints 66 thereof, in the embodiment illustrated, because of the relative fore and aft movement of tube 17 to which the valve 19 is bolted or otherwise connected. By the same token, line 63 between valve 21 and cylinder 20 is made of flexible hose.

Line 25 connecting the outlet side of valve 24 to the synchronizing control cylinder 26 actuates a plunger 67 as shown in Figure 5 to operatively effect the pump control mechanism 32.

*Pump and pump control mechanism*

The adjustable pressure pump 30 comprises a casing 68 rigidly bolted to a suitable foundation. Brackets 69 and 70 are bolted respectively to the left and right sides of casing 68. These brackets carry arms 71 and 72, respectively, to support a pump control mechanism. At the front of pump 30 there is a cover plate 73 and a similar suitable cover plate 74 at the rear to enclose the pump. Threaded pressure connection plates 75 and 76 are bolted by bolts 77 in concentric position about a left-hand port 78 and right-hand port 79, respectively, of the pump. In the operation of pump 30, which is of a well-known commercial type, when port 78 is the intake port, port 79 is the discharge port. Conversely, when port 79 is the intake or suction line, port 78 is the discharge port. In this type of pump motive power is supplied through a shaft 80 journaled in bearings enclosed within the casing of the pump and not shown. Pump 30 operates in such fashion that when the interior or working elements thereof are laterally shifted to the left, port 79 becomes the discharge port and when the interior portions are shifted to the right, port 78 becomes the discharge port. Except as may be done by the adjustable stop earlier mentioned, the extent of any movement of the working parts to the left or right of the vertical center line through the axis of the pump is limited by internal stops within the pump 30. When the slidable working parts of the pump are concentric with shaft 80, the pump is in neutral position and no pumping action is obtained. These laterally shiftable interior parts of the pump are rigidly affixed to a pair of guide rods 81 extending to the left through casing 68. Guide rods 81 are connected to a crosshead 82 by nuts 83. On the right, a similar pair of guide rods 84 extend through casing 68 and are connected to a crosshead 85 and lower clevis 85' by nuts 86. Thus, in effect, crossheads 82 and 85 are themselves rigidly connected together.

Within cylinders in the lower parts of brackets 69 and 70, plungers 87 and 88 are respectively located for actuation in each case away from the pump 30 by the introduction of oil under pressure through port 89 into chamber 90 in the case of plunger 87 and through port 91 into chamber 92 in the case of plunger 88. Plungers 87 and 88 are located in the plane of the guide rod pairs 81 and 84 and operate parallel thereto and midway between said pairs. Moreover, plungers 87 and 88 abut the inside of crossheads 82 and 85, respectively. These plungers 87 and 88 are also lubricated by capillary action of the actuating fluid in the sealing pressure system entering chambers 90 and 92 and working between the plungers and the corresponding closely fitting cylinders in brackets 69 and 70 without undue loss or leakage of oil. Such oil as does pass through such bores is collected in oil-collecting chambers 93 whence the oil is returned through openings 94 to tank 27 by suitable lines.

Pivotally mounted in clevis 85' is a trunnion block 95 pivoted at 96 and slidably engaging a lower forked end 97 of a lever 98. Lever 98 is pivotally connected at 99 to bracket arm 72. The upper end of lever 98 is journaled in a clevis 100. Clevis 100 is fixedly attached to a main spring rod 101 extending rearwardly thereof, the forward portion of which spring rod 101 is threaded as indicated at 102 and the opposite end of which spring rod 101 terminates in a cap 103 on the far side of a crosshead 104 through which spring rod 101 passes in slidable relation thereto. On the threaded portion 102 there are two capstan nuts 103' and a roller bearing 104' backing up spring retainer 105. A spring 106 is concentrically disposed on spring rod 101 between spring retainer 105 and a second spring retainer 107. Spring retainer 107 abuts against the forward face of crosshead 104 and is slidably engaged by spring rod 101. By turning the capstan nuts 103', any desired amount of compression can be applied to spring 106. This adjustment is predetermined in accordance with the sealing pressure that must be generated to seal against the force of the testing pressure which will be encountered.

Crosshead 104 operates in a horizontal plane and at the respective outer ends thereof is engaged by a pair of spacing bolts 108. The elongated forward ends of spacing bolts 108 comprise spring rods 109 which extend through and slidably engage crosshead 104. The forward ends of the spring rods 109 are threaded for the reception of lock nuts 110. Between crosshead 104 and the lock nuts 110 there are respectively located on each spring rod 109 a spring retainer 111, a spring 112 and a second spring retainer 113. Across the rearmost ends of the spacing bolts 108 there is a crosshead 114 which is fixedly connected thereto by the nuts 115. Spacing bolts 108 also freely extend through bushing lined openings 116 in arm 71 and openings 117 in cylinder head 118.

An air cylinder 119 is positioned between arm 71 and cylinder head 118. In air cylinder 119 there is a piston 120 and a fibrous piston facing disc 121. A piston rod 122 has a stud shoulder 123 the forward end of which is threaded into a piston follower 124 to connect piston rod 122 to piston 120. Piston rod 122 extends through a bushing 125 in cylinder head 118 and abuts against the forward, that is the right side of crosshead 114. Cylinder 119 is single acting and operates by compressed air entering the cylinder through port 126 when air valve 33 is opened. Extending rearwardly of crosshead 114 intermediate the ends thereof is a stud shaft 127, the forward end of which is threaded for engagement with the crosshead 114 and for engagement with adjusting nuts 128.

Synchronization cylinder 26 has a plunger 67 therein which normally abuts the end of stud shaft 127. Cylinder 26 is maintained in position in the pump control mechanism 32 by spacing bolts 130 respectively threaded into cylinder head 118 at their forward ends. Cylinder head 118 in turn is maintained in position relative arm 71 by the bolts 131.

A packing gland 133 using conventional packing is bolted to cylinder 26 and prevents leakage of the high pressure testing fluid around plunger 67. Between the packing gland 133 and the adjusting nuts 128, a spring 132 is positioned at the respective ends of which suitable retainers 134 and 135 are provided. Hence, by means of adjusting nuts 128 the loading of spring 132 can be varied for the purpose of effectively and automatically sealing the test specimen with the correct amount of sealing force during the prefilling stage of the testing cycle.

Returning to the bracket 69, it will be observed that bracket 69 also supports a countersealing cylinder 140 by means of connecting spacing bolts 141. A plunger 142 is provided in cylinder 140 and is abutted by the left side of crosshead 82 substantially in axial alignment with plunger 87 when crosshead 82 moves to the left past its non-pumping position a predetermined distance less than the full distance which otherwise would be possible before the internal stop in the pump became effective. Any movement of plunger 142 away from pump 30 is limited by a set screw 143 which is locked in position by a nut 144. Actuation of plunger 142 in a single direction toward pump 30 is obtained when valve 33' is opened by passage of fluid in the sealing pressure system through line 145 and port 146 into chamber 147.

In the sealing pressure system there is a conventional valve 35 having a low-pressure chamber 150 and a high-pressure chamber 151. A poppet valve 152 is seated to normally prevent flow between chambers and is held in position by spring 153 located in the bonnet of the valve. Interiorly of the stem of poppet valve 152 there is a ball valve 154 in a chamber containing a plunger 155 and a spring 156 adapted to hold the ball valve 154 in closed position. Ports 157 and 158 in the poppet valve 152 give access to the ball valve chamber. The ball valve chamber is completed by a retainer 159 slidably mounted with the stem of the poppet valve in the bonnet 160. Oppositely disposed to bonnet 160 there is a dome 161 in which a piston 162 reciprocates in such fashion that a pin 163 extending upwardly from piston 162 is positioned concentrically in port 159 adjacent the bottom of ball valve 154. Valve 35 controls the filling and relief of the sealing plunger cylinders 51 during the closing and opening of the test bench.

Testing cycle

In the testing cycle the front and rear sealing heads and the positioning cylinders are in proper spaced relation on the tension bars 14 to accommodate the specimens of pipe 10 to be tested. In some cases, as is well known, all of the production is so tested. Thus, equipment, as disclosed by this invention, that is as automatic as possible, rapid and not subject to causing pipe failures is of extreme importance. With the test bench open, plungers 16, tube 17, platen 12 and pistons 44 are respectively positioned to the left. Pump 30 is pumping under the effect of spring 112, and purge valve 41 is open. Under this condition, valve 33 has been turned to admit and maintain compressed air into line 170, port 126 and cylinder 119 causing piston rod 122 to push crosshead 114 and thereby spring rod 101 into its extreme left-hand position against the pressure of spring 132. When spring rod 101 is pushed to the left as a result of the air pressure on piston 120, clevis 100 moves to the left through spring rods 109, spring 112, crosshead 104, and spring rod 101. Crosshead 85 in turn moves to the right through lever 98 and the trunnion block 95. Pump 30 thus begins to discharge oil from tank 27 into line 171 through port 78. As oil from port 78 begins to be discharged, a bleed line 172 feeds some of that oil into port 89 to actuate plunger 87 to return pump 30 to neutral position, the position diagrammatically shown in Figure 5. However, plunger 87 is ineffective in restoring the pump to non-pumping position until sufficient pressure builds up in the sealing pressure system to move the bottom of lever 98 to the left against the pressure of springs 112, the right-hand ends of which are being held in relatively fixed position by the piston rod 122. In the embodiment shown, springs 112 are set for a back pressure of possibly 1000 pounds per square inch, although not all of such pressure is necessarily utilized or reached in the system since the intended movement of the test bench parts into open or closure position with a hollow body is expected to take place at a lower pressure than the back pressure setting of springs 112. As oil flows through line 171 under pressure into connecting line 173 by manipulation of valve 34, the oil passing through line 173 enters the positioning cylinders 18 through ports 46 forcing platen 12 to the right until the pipe 10 to be tested is hard up against and end sealed between platen 12 and sealing head 13 as shown in Figure 2. At that point, valve 33 is turned to cut off the supply of air and permit the air cylinder 119 to exhaust through port 126 and the valve. Thereupon spring rod 101, under the influence of spring 132 and through spacing bolts 108, crosshead 104 and spring 106, will move hard over to the right forcing crosshead 82 through the neutral position to the hard-over left position. Even if the operator should forget to shut off the supply of air to cylinder 119, no damage is done because when the pressure in the sealing pressure system builds up to the pressure controlled by springs 112, the pump will shut off.

The oil passing through line 174 into dome 161 at the bottom of valve 35 lifts piston 162 because of its relatively large surface area. Consequently, ball valve 154 and then poppet valve 152 are lifted, permitting oil to be drawn from tank 27 through line 175 into the chambers 53 through lines 176 and ports 54. Because of the absence of substantial friction due to the omission of the conventional packing, the pressure required to move sealing platen 12 into place is materially reduced despite the force required to draw oil into chambers 53.

When spring 132 forces spring rod 101 to the right causing crosshead 82 to move through the neutral position to the hard-over left position of the pump, discharge begins through the right-hand port 79 into the lines 177 connected directly to lines 176 in the sealing pressure system to exert positive sealing pressure against the bases of sealing plungers 16. At the same time, a bleed connection 178 passes oil in the sealing pressure system through port 91 to chamber 92 to cause plunger 88 to tend to press crosshead 85 toward the right and thus return the pump to neutral or non-pumping position. Since spring 132 in the embodiment shown is set for a pressure of about 30 pounds per square inch, this pressure has to be reached before the pump 30 can return to neutral position against its force. A pressure of about 30 pounds per square inch on plungers 16 is usually sufficient to effect the presealing required during the prefilling of pipe 10 with water. If a greater pressure is required for sealing at this stage of the cycle, a suitable compression of spring 132 can be effected by adjustment of the nuts 128. If a still wider range is required, a still stronger spring can be substituted for spring 132.

The prefilling of pipe 10 is performed at this stage of the cycle while the sealing pressure system is under the influence of spring 132 by an operator who turns air valve 21 to admit air into line 63, and thereby move poppet valve 59 off its seat permitting water to flow through tube 17 and platen 12 into the interior of pipe 10. When the flow through purge valve 41 is a solid stream, purge valve 41 is closed, air valve 21 is turned to exhaust cylinder 20 and poppet valve 59 closes against the pressure of the water in hose 57.

Valve 24 is then opened putting the testing pressure system and pipe 10 under the testing pressure of the water in the high-pressure line 64. This pressure is sufficient to force plunger 67 against the end of spring rod 127 moving crossheads 114 and 104, spring 106 and clevis 100 all the way to the right and thereby moving crosshead 82 all the way to the left unless it is already there because the pump is still pumping from port 79 under the influence of spring 132 which normally insures spring rod 101 remaining in its right-hand position. The extent of the movement of crosshead 82 to the left is necessarily controlled by the axial adjustment of plunger 142 under the influence of set screw 143. In this manner the presetting of plunger 142 in an axial direction to correspond to the needed rate of volume delivery from port 79 for sealing during the testing stage particularly prevents the sealing pressure from building up too rapidly relative the building up of the testing pressure in pipe 10 due to the pressure of the water in line 64, whereby a collapse of pipe 10 might be induced. Thus, by this predetermined adjustment of the position of plunger 142, the rate of application of the sealing force against the pipe 10 will be sufficient, in accordance with and in proportion to the rate of application of the testing pressure. For example, if pump 30 has a normal discharge capacity of 22 gallons per minute from port 79 when hard over to the right, plunger 142 can be so adjusted to prevent crosshead 82 from going hard over to the left and thereby limit the discharge from port 79 to an illustrative figure of 3 gallons per minute.

The passage of oil from port 79 through bleed line 178 will tend to restore the pump to neutral position but cannot unless and until the pressure in line 178 can overcome the pressure of control spring 106, which may be set by adjustment of the capstan nuts 103 as high as required. In this way and by virtue of the adjustment of springs 132 and 106, a wide and positively controlled range of pressures of, for example, from 30 pounds to 2500 pounds per square inch can be obtained on a single test bench without wobbling or variation in the different sealing pressures which have to be maintained at the respective stages. Moreover, testing pressures at the present time are trending toward values much above 2500 pounds per square inch to which higher pressures the teachings of this invention will also be applicable. The compression of control spring 106 is proportioned both to the size of the pipe to be tested and the testing pressure in line 64 which is to be used so that at all times the sealing pressure of the system in the testing pressure stage of the cycle will be sufficient to hold platen 12 in sealing engagement against the testing pressure of the water within pipe 10.

It will sometimes happen that the effective area of the sealing plungers 16 under the sealing pressure developed by pump 30 during the testing pressure stage of the testing cycle will develop more sealing force than is desired when, for example, testing certain pipe of small diameter. In such a situation, valve 33' is opened to permit the hydraulic fluid in the sealing pressure system to pass through line 145 into chamber 147, thereby actuating plunger 142 to push against crosshead 82 and supplement the force of plunger 88 to restore pump 30 to neutral non-pumping position before the sealing force reaches the maximum which would otherwise be attained if controlled solely by the effective area of plunger 88 working against the force of spring 106. The cross sectional area of plunger 142 should be determined in advance for the particular equipment and service to be performed.

As pipe 10 tends to shorten under the testing pressure of the water therein, the sealing force due to the pressure in the sealing pressure system automatically will cause platen 12 to creep or move forward to maintain the sealing engagement. Plunger 67 is chosen so as to keep spring rod 101 hard over to the right upon the opening of valve 24. However, the operative area of plunger 67 can be so selected that should the testing pressure in line 25 not reach the contemplated maximum, pump 30 will return to non-pumping position without having to go to the pressure called for by the setting of control spring 106. During the test at testing pressure valves 59, 152 and 154 in valve 35 remain seated. Because of the absence of any packing friction connected with plungers 16, there is no excessive or oversealing force developed in the practice of this invention. In conventional devices such oversealing causes frequent failure when testing large diameter thin-walled pipes to within, for example, 80% of their yield strengths.

Upon completion of the test, valve 24 is closed and purge valve 41 is cracked open to drop the pressure in the testing pressure system and remove the pressure on plunger 67. Valve 33 is then opened actuating piston rod 122 to move spring rod 101 to the left. Pump 30 begins to discharge from port 78 through lines 171 and 179, due to a new setting of valve 34, into positioning cylinders 18 through ports 47. The pressure in the sealing pressure system is thus again controlled by the force of springs 112. Movement of the pistons 44 to the left forces the sealing platen 12 away from the end of the test specimen so that it can be removed and returns the sealing plungers 16 and platen 12 to their open or withdrawn position. The oil in chambers 53 is forced out through ports 54 into the line 176 whence it returns through a line 50, valve 35 and line 175 to tank 27. This is possible because the pressure in line 174 has again lifted ball valve 154 and then poppet valve 152 to equalize the pressure on the two sides of valve 35. When the platen 12 is completely withdrawn, valve 33 is left on. The pressure in the sealing pressure system is sustained under the influence of springs 112. If valve 33 is shut off, a wedge or latch (not shown) can be placed between the cylinder head 118 and the nearer side of crosshead 114 to hold spring rod 101 in neutral position against the pressure of spring 132. Either way, the system is ready for the initiation of a new testing cycle.

Although we have illustrated and described but a preferred embodiment of this invention, it will be understood that changes in the apparatus and procedure described may be made without departing from the spirit of the invention or the scope of the appended claims.

We claim:
1. A system for hydrostatically testing hollow bodies, comprising, in combination, a sealing pressure system including an atmospheric tank for sealing pressure fluid, a separately contained testing pressure system, sealing members having substantially frictionless relative sealing movement and adapted to be moved into sealing engagement with a hollow body, connections between said sealing pressure system and said sealing members for effecting such sealing engagement, connections between said hollow body and said testing pressure system for prefilling said hollow body with testing liquid and then supplying additional testing liquid at testing pressure, a fluid pressure source for said sealing pressure system, a control mechanism for said fluid pressure source, and mechanism substantially continuously responsive to the pressure in said testing pressure system to move said control mechanism into operative relation to vary the fluid delivery from said source to maintain said sealing members in sealing engagement during and in accordance with variations of pressure in said testing pressure system.

2. In hydrostatic testing apparatus for hollow bodies having sealing members, in combination, piston displacement means for closing and opening the distance between such members, substantially frictionless piston displacement means for effecting sealing engagement of said members against the ends of a hollow body during the prefilling and testing thereof by means of a testing pressure system, a sealing pressure system to actuate said displacement means, said sealing pressure system being separate from said testing pressure system, a pump mechanism for supplying liquid under pressure to said sealing pressure system, a tank containing such liquid substantially at atmospheric pressure for said pump mechanism, means for supplying such liquid at different rates respectively to said first-named and said second-named displacement means, a control mechanism operative to control the pressure of the liquid being supplied by said pump mechanism to said sealing pressure system, said control mechanism having a plurality of preadjusted resilient means to prevent the automatic return of the working parts of said pump to non-pumping position until the pressure in said sealing pressure system reaches the resistance pressure of the particular resilient means controlling at the time being, said resilient means being respectively abutted by connections to said pump when said pump is operating, the first of said resilient means adapted to control said pressure to actuate said first-named piston displacement means, the second of said resilient means adapted to control said pressure to hold said sealing engagement during prefilling of said hollow body, the third of said resilient means adapted to control said pressure to maintain said sealing engagement during testing of said hollow body, said control mechanism being substantially continuously responsive to the pressure in said testing pressure system when said third of said resilient means is operative, and mechanism for selectively placing said respective resilient means into operation.

3. In hydrostatic testing apparatus for hollow bodies, in combination, sealing members, piston displacement means for changing the distance between such members, substantially frictionless piston displacement means for effecting sealing engagement of said members against a hollow body, a testing pressure system for prefilling and hydrostatically testing said hollow body, a sealing pressure system to actuate said displacement means, said sealing pressure system being separate from said testing pressure system, a pump mechanism for supplying liquid under different pressures and at different rates to said sealing pressure system at different stages of the testing cycle on said hollow body to perform all of such sealing engagement, said pump mechanism adapted to return to non-pumping position upon commencement of any discharge therefrom unless otherwise prevented, a control mechanism operative to control the pressure of the liquid being supplied by said pump mechanism to said sealing pressure system, said control mechanism comprising a plurality of preadjusted resilient means to prevent the automatic return of said pump to non-pumping position until the pressure in said sealing pressure system reaches the resistance pressure of the particular resilient means controlling at the time being, said resilient means being respectively abutted by connections to said pump when said pump is operating, one of said resilient means adapted to control said pressure to actuate said first-named piston displacement means, a second said resilient means adapted to control said pressure to hold said sealing engagement during prefilling of said hollow body, a third said resilient means adapted to control said pressure to maintain said sealing engagement during testing of said hollow body, valve means for selectively placing the first and second of said resilient means into operation, and piston displacement means connected in and responsive to the testing pressure in said testing pressure system for placing said third of said resilient means into operation, said control mechanism being substantially continuously responsive to the operation of said last-mentioned piston displacement means, whereby said sealing pressure during testing of said hollow body under testing pressure is maintained in excess of said testing pressure by the preadjustment of said third resilient means dependent upon the internal diameter of a hollow body to be tested and the testing pressure to be used.

4. In a sealing pressure system for use with apparatus for hydrostatically testing a hollow body, a pump adapted to return to non-pumping position upon commencement of any discharge therefrom unless otherwise prevented, said pump providing all pressure for sealing in said sealing pressure system and having at least two discharge ports only one of which is operative as a discharge port at any one time, means for shifting the working parts of said pump to cause discharge from one or the other of said ports, piston displacement means adjacent each of said ports and adapted to move said working parts in the opposite direction upon commencement of any discharge from said adjacent port, adjustable means limiting the movement of one of said piston displacement means and adapted to vary the rate of discharge from one of said two discharge ports relative the other, a control mechanism connected to said working parts, said control mechanism containing a plurality of resilient means adapted to prevent the return of the working parts of said pump to neutral non-pumping position until the pressure of the discharge from said pump at the time being reaches the predetermined pressure of said resilient means, valve means to position said control mechanism to cause discharge from one port of sufficient pressure to move said apparatus into and away from testing position relative said hollow body against the controlling resistance of the first of said resilient means, a second resilient means adapted to maintain sufficient sealing pressure during the prefilling of said hollow body with liquid, and means exerted by the hydrostatic testing pressure to which the hollow body is subjected for substantially continuously maintaining a third of said resilient means in responsive operative position to maintain sealing engagement during such testing of said hollow body and any foreshortening thereof as a consequence of such testing pressure therein.

5. In hydrostatic testing apparatus for hollow bodies, in combination, a pair of oppositely disposed sealing heads for said hollow bodies, said sealing heads being movable relative to each other, piston displacement means for moving said sealing heads into closure position relative to a hollow body, substantially frictionless piston displacement means for effecting sealing engagement between said sealing heads and said hollow body, a sealing pressure system for actuating said piston displacement means, a hydraulic pump in said sealing pressure system adapted to supply hydraulic fluid under pressure to said respective piston displacement means, a tank containing said hydraulic fluid substantially at atmospheric pressure for said pump, means for selectively operating said respective piston displacement means, a separate testing pressure system for supplying liquid to the interior of said hollow body, and means substantially continuously responsive to the pressure in said testing pressure system during the testing pressure stage of the testing cycle to control the volume of the discharge of said hydraulic fluid by said pump when said second-named piston displacement means are being operated, whereby the rate of the build up of pressure in said sealing pressure system is substantially proportioned to and in accordance with the rate of build up of pressure in the testing pressure system particularly during the testing pressure stage of the testing cycle.

6. In combination, a hydrostatic testing apparatus for hollow bodies, said apparatus having sealing members including relatively frictionless plungers and adapted to move substantially without friction relative to each other and to a hollow body to be tested when positioned therebetween, a sealing pressure system for controlling the relative movement of said sealing members, a hydraulic pump in said sealing pressure system adapted to supply hydraulic fluid under pressure to said sealing pressure system during the respective stages in the testing cycle, a tank containing said hydraulic fluid substantially at atmospheric pressure for said pump, a separately contained testing pressure system adapted to supply testing fluid to said hollow body during certain of the respective stages of the testing cycle, means movably connected to said testing pressure system and substantially continuously responsive to the pressure in said testing pressure system, means movably connected to said pump to selectively control the rate of discharge from said pump, said two last-mentioned means being in opposed engagement during the testing pressure stage of the testing cycle to vary the pressure build up in said sealing pressure system during such stage substantially in proportion to and synchronized with the build up of the testing pressure in the testing pressure system, to avoid any crushing of the hollow body being tested.

7. In hydrostatic testing apparatus for hollow bodies, in combination, a pair of oppositely disposed sealing heads for said hollow bodies, said sealing heads being movable relative to each other and to a hollow body placed therebetween, piston displacement means for moving said sealing heads into closure position and for effecting sealing engagement with said hollow body, a sealing pressure system connected to said piston displacement means, a hydraulic pump for supplying hydraulic fluid under pressure to said sealing pressure system to operate said piston displacement means, said hydraulic fluid under pressure from said pump providing all such sealing engagement, resilient means for sequentially controlling the pressure of said hydraulic fluid in said sealing pressure system in accordance with the pressure respectively required during the various stages in the testing cycle, means for restoring said pump to non-pumping position when the force exerted by the pressure in said sealing pressure system equals the force exerted by the resilient means controlling at the time being, and supplemental piston area means for assisting the restoration of said pump to non-pumping position when a hollow body of smaller diameter or weaker physical properties is being tested, whereby the minimum sealing force inherent in said apparatus during the testing pressure stage of the testing cycle is made commensurate with the physical properties of the smaller diameter or weaker pipe being tested.

8. A system for hydrostatically testing hollow bodies, comprising, in combination, oppositely disposed sealing heads, a pair of sealing plungers positioned in cylinders in one such head for actuating a sealing platen, a hollow body adapted to be pressure sealed between the other such head and said platen, said plungers being fitted into the bores in said cylinders with capillary clearances therebetween, a testing pressure system for supplying prefilling testing liquid at one pressure and additional testing liquid at testing pressure to said hollow body, a separate sealing pressure system containing sealing liquid adapted to maintain said sealing members in sealing engagement with said hollow body and to lubricate said plungers by capillary action, an adjustable pressure source connected in said sealing pressure system, a tank containing said sealing liquid substantially at atmospheric pressure for said adjustable pressure source, a preadjusted control mechanism for said source so constructed and arranged as to maintain said source at sealing pressure during the prefilling and testing of said hollow body at testing pressure, and a pressure responsive device interconnected between said sealing pressure system and said testing pressure system adapted to substantially continuously move said preadjusted control mechanism in responsive relation to the pressure of said testing liquid, whereby the total sealing pressure is not substantially in excess of the total testing pressure, said sealing members automatically take up any reduction in the length of said hollow body between said sealing members and said sealing pressure by virtue of said preadjustment of said control mechanism is capable of effecting such sealing pressure irrespective of the size of the openings of said hollow bodies so sealed or the testing pressure applied thereto.

9. In hydrostatic testing apparatus for hollow bodies, in combination, sealing members, piston displacement means for changing the distance between such members, other piston displacement means for effecting sealing engagement of said members against a hollow body, said other piston displacement means, at least, having closely machined tolerances to prevent leakage between the moving parts thereof in packless frictional engagement, a testing pressure system for prefilling and hydrostatically testing said hollow body, a sealing pressure system to actuate said displacement means, said sealing pressure system being separate from said testing pressure system, a pump mechanism for supplying liquid under different pressures to said sealing pressure system at different stages of the testing cycle on said hollow body, said pump mechanism adapted to return to non-pumping position upon commencement of any discharge therefrom unless otherwise prevented, a tank containing said liquid substantially at atmospheric pressure for said pump mechanism, a control mechanism operative to control the pressure of the liquid being supplied to said sealing pressure system, said control mechanism comprising a plurality of preadjusted resilient means to prevent the automatic return of said pump to non-pumping position until the pressure in said sealing pressure system reaches the resistance pressure of the particular resilient means controlling at the time being, said resilient means being respectively abutted by connections to said pump when said pump is operating, one of said resilient means adapted to control said pressure to actuate said first-named piston displacement means, a second said resilient means adapted to control said pressure to hold said sealing engagement during prefilling of said hollow body, a third said resilient means adapted to control said pressure to maintain said sealing engagement during testing of said hollow body, valve means for selectively placing the first and second of said resilient means into operation, and piston displacement means connected in and substantially continuously responsive to the testing pressure in said testing pressure system for controlling said third of said resilient means in operation, whereby said sealing pressure during testing of said hollow body under testing pressure is maintained not substantially in excess of said testing pressure by the preadjustment of said third resilient means dependent upon the internal diameter of a hollow body to be tested and the testing pressure to be used.

10. In combination, in hydrostatic testing apparatus for hollow bodies, said apparatus having sealing members adapted to move relative to each other and to a hollow body to be tested when positioned therebetween, a sealing pressure system for controlling the relative movement of said sealing members, a hydraulic pump in said sealing pressure system adapted to supply hydraulic fluid under pressure to said sealing pressure system during the respective stages in the testing cycle, said pump providing pressure for all relative sealing movement between said sealing members, a testing pressure system adapted to supply testing fluid to said hollow body during certain of the respective stages of the testing cycle, control mechanism directly responsive to changes in pressure in the testing pressure system during the testing cycle to vary the fluid delivery from said pump, said sealing members further being constructed and arranged with machined capillary tolerances at least between the principal parts thereof in sliding engagement with each other, whereby said sealing members may effectively maintain sealing engagement with said hollow body and creep together as required during the testing pressure stage of the testing cycle without having to overcome any frictional force of the order which would be present if conventional packing had been used.

11. In hydrostatic testing apparatus for hollow bodies, in combination, a pair of oppositely disposed sealing heads for said hollow bodies, said sealing heads being movable relative to each other, piston displacement means for moving said sealing heads into closure position relative to a hollow body, other piston displacement means for effecting sealing engagement between said sealing heads and said hollow body, said other piston displacement means having fitted capillary tolerances without packing relative the cooperating parts of the apparatus in sliding engagement therewith, a sealing pressure system for actuating said piston displacement means, a hydraulic pump in said sealing pressure system adapted to supply hydraulic fluid under pressure to said respective piston displacement means, means for selectively operating said respective piston displacement means, a separate testing pressure system, and means substantially continuously responsive to the pressure in said testing pressure system to control the volume of discharge of said hydraulic fluid by said pump when said second-named piston displacement means are being actuated in a testing pressure stage, whereby the rate of the build up of pressure in said sealing pressure system is substantially proportioned to and in accordance with the rate of build up of pressure in the testing pressure system particularly during the testing pressure stage of the testing cycle, and said sealing heads may effectively maintain sealing engagement and creep together as required during said testing pressure stage without having to overcome any frictional force other than that due to said fitted capillary tolerances.

12. A system for hydrostatically testing hollow bodies, comprising in combination, oppositely disposed sealing members including substantially packless plungers for relatively frictionless sealing movement between said sealing members, a self-contained sealing pressure system connected to at least one of said members to effect sealing engagement with a hollow body placed therebetween, a separately contained testing pressure system adapted to supply testing liquid to prefill said hollow body at one pressure and to supply additional testing fluid thereafter to said hollow body at a higher testing pressure, a fluid pressure source in said sealing pressure system to provide pressure for all such sealing engagement, a movable control for said pressure source, a movable member acting against said control to maintain it in pressure-producing position, said movable member being substantially continuously responsive to the testing liquid in said testing pressure system to vary the fluid delivery from said source, whereby the attainment and maintenance of sealing pressure in said sealing pressure system is synchronized with the attainment and maintenance of testing pressure in said testing pressure system.

13. A system for hydrostatically testing hollow bodies, comprising in combination, oppositely disposed sealing members, a self-contained sealing pressure system connected to at least one of said members to effect sealing engagement with a hollow body placed therebetween, a separately contained testing pressure system adapted to supply testing liquid to prefill said hollow body at one pressure and to supply additional testing fluid thereafter to said hollow body at a higher testing pressure, a pump in said sealing pressure system to provide pressure for all such sealing engagement, a movable control for said pump, means for moving said pump into non-pumping position, a movable member substantially continuously acting against said control to maintain it in pressure producing position, said movable member being acted upon directly by the testing liquid in said testing pressure system, and an abutment member to limit the movement of said control into pumping position, said abutment member being adapted to limit the rate of application of pressure in said sealing pressure system.

14. A system for hydrostatically testing hollow bodies, comprising in combination, oppositely disposed sealing members, a self-contained sealing pressure system connected to at least one of said members to effect sealing engagement with a hollow body placed therebetween, a separately contained testing pressure system adapted to supply testing liquid to prefill said hollow body at one pressure and to supply additional testing fluid thereafter to said hollow body at a higher testing pressure, a pump in said sealing pressure system, a movable control for said pump, means for moving said pump into non-pumping position, a movable member acting against said control to maintain it in pressure producing position, said movable member being substantially continuously acted upon directly by the testing liquid in said testing pressure system, an abutment member to limit the movement of said control into pumping position, said abutment member being movable against said control to urge it into non-pumping position, and a valve for admitting fluid under pressure in said sealing pressure system against one end of said abutment member to so move it, whereby said abutment member will limit the rate of application of said pressure in said sealing pressure system when pressed in one direction and will limit the pressure in said sealing pressure system when moved in the other direction.

References Cited in the file of this patent

UNITED STATES PATENTS

| Number | Name | Date |
| --- | --- | --- |
| 1,613,150 | Zore | Jan. 4, 1927 |
| 1,811,138 | Lassman | June 23, 1931 |
| 2,135,721 | Landenberger | Nov. 8, 1938 |
| 2,231,807 | Hybarger | Feb. 11, 1941 |
| 2,326,345 | Ernst et al. | Aug. 10, 1943 |
| 2,329,035 | Cross | Sept. 7, 1943 |
| 2,512,799 | Huber | June 27, 1950 |
| 2,520,856 | Schowalter | Aug. 29, 1950 |
| 2,522,927 | Camerota | Sept. 19, 1950 |